US012463986B2

(12) United States Patent
Weizman et al.

(10) Patent No.: US 12,463,986 B2
(45) Date of Patent: Nov. 4, 2025

(54) CLOUD ATTACK DETECTION VIA API ACCESS ANALYSIS

(71) Applicant: Microsoft Technology Licensing, LLC, Redmond, WA (US)

(72) Inventors: Josef Weizman, Haifa (IL); Ram Haim Pliskin, Rishon Lezion (IL); Aharon Naftali Michaels, Beit Shemesh (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 407 days.

(21) Appl. No.: 17/896,624

(22) Filed: Aug. 26, 2022

(65) Prior Publication Data
US 2024/0073223 A1 Feb. 29, 2024

(51) Int. Cl.
*H04L 9/40* (2022.01)

(52) U.S. Cl.
CPC .................. *H04L 63/1416* (2013.01)

(58) Field of Classification Search
CPC .................................................... H04L 63/1416
See application file for complete search history.

(56) References Cited

U.S. PATENT DOCUMENTS

| | | | | |
|---|---|---|---|---|
| 10,637,890 B2* | 4/2020 | Chen | .................. | H04L 63/0272 |
| 10,819,728 B2* | 10/2020 | Chen | .................. | H04L 63/1483 |
| 10,846,122 B2* | 11/2020 | Beyer | .................. | G06F 9/5072 |
| 10,911,406 B2* | 2/2021 | Tewari | .................. | H04L 63/102 |
| 10,944,685 B2* | 3/2021 | Conti | .................. | H04L 47/70 |
| 11,240,203 B1* | 2/2022 | Eyada | .................. | H04L 63/20 |
| 11,290,460 B2* | 3/2022 | Levin | .................. | G06F 21/53 |
| 11,470,047 B1* | 10/2022 | Shevade | .................. | H04L 12/4641 |
| 11,550,616 B2* | 1/2023 | Lolage | .................. | H04L 41/122 |
| 11,563,763 B1* | 1/2023 | McLinden | .................. | H04W 12/122 |
| 11,888,760 B2* | 1/2024 | Anderson | .................. | G06N 5/022 |
| 12,021,902 B1* | 6/2024 | Qian | .................. | H04L 63/205 |
| 12,075,254 B1* | 8/2024 | Gupta | .................. | H04W 12/37 |
| 12,177,137 B1* | 12/2024 | Park | .................. | H04L 45/76 |
| 2019/0141015 A1 | 5/2019 | Nellen | | |

(Continued)

OTHER PUBLICATIONS

International Search Report and Written Opinion received for PCT Application No. PCT/US2023/027212, mailed on Jan. 8, 2024, 15 pages.

(Continued)

*Primary Examiner* — Iral S Lakhia
(74) *Attorney, Agent, or Firm* — Schwegman Lundberg & Woessner, P.A.

(57) ABSTRACT

Generally discussed herein are devices, systems, and methods for cloud resource security. A method can include receiving, at a monitor device and from a first cloud resource of cloud resources hosted by a cloud provider, a request for a token that uniquely identifies the first cloud resource, the request indicating a destination that is a metadata server. The method can include comparing, based on entries in an application programming interface (API) access log, the cloud provider associated with the first cloud resource and a cloud provider associated with the metadata server. The method can include responsive to the cloud provider of the first cloud resource being different from the cloud provider of the metadata server performing a security mitigation action.

17 Claims, 5 Drawing Sheets

(56) References Cited

U.S. PATENT DOCUMENTS

| | | | | |
|---|---|---|---|---|
| 2019/0394049 A1* | 12/2019 | Hartwig | ............. | H04L 63/0428 |
| 2020/0213320 A1* | 7/2020 | Levin | ..................... | G06F 9/468 |
| 2020/0336484 A1* | 10/2020 | Mahajan | ............ | H04L 63/0884 |
| 2021/0185006 A1* | 6/2021 | Leonard | ................. | H04L 63/20 |
| 2021/0342196 A1* | 11/2021 | Natarajan | ........... | H04L 41/0895 |
| 2021/0409486 A1* | 12/2021 | Martinez | ............ | H04L 67/1001 |
| 2022/0029966 A1* | 1/2022 | Park | ..................... | H04L 63/029 |
| 2022/0385682 A1* | 12/2022 | Levin | ..................... | H04L 67/10 |
| 2023/0164038 A1* | 5/2023 | Epstein | .................. | H04L 41/22 |
| | | | | 709/221 |
| 2023/0230001 A1* | 7/2023 | Draznin | ........... | G06Q 10/06314 |
| | | | | 705/7.24 |

OTHER PUBLICATIONS

Santa, et al., "MIGRATE: Mobile Device Virtualization Through State Transfer", IEEE Access, vol. 8, Feb. 3, 2020, pp. 25848-25862.

* cited by examiner

CLOUD ATTACK DETECTION VIA API ACCESS ANALYSIS

BACKGROUND

As cloud computing gains popularity, cloud resources cloud computing services get more attention from cyber attackers. The number of cyberattacks that involve cloud resources keeps increasing as cloud computing gets more popular. Applying security solutions that help address the threat posed by cyber attackers becomes more important as the popularity of cloud computing increases.

SUMMARY

A device, system, method, and computer-readable medium configured for cloud resource security are provided. Examples can detect when a cloud resource is requesting identifying information from a cloud provider that is different from the cloud provider of the cloud resource. Such a situation is suspect and could mean an attack on the cloud resources of the cloud provider of the cloud resource. Such a situation can be detected, flagged, and mitigated thus helping improve the security of the cloud resources of the cloud provider.

A method for cloud computer security can include receiving, at a monitor device and from a first cloud resource of cloud resources hosted by a cloud provider, a request for a token that uniquely identifies the first cloud resource, the request indicating a destination that is a metadata server. The method can include comparing, based on entries in an application programming interface (API) access log, the cloud provider associated with the first cloud resource and a cloud provider associated with the metadata server. The method can include responsive to the cloud provider of the first cloud resource being different from the cloud provider of the metadata server performing a security mitigation action.

The security mitigation action can include one of checking the legitimacy of the request, running an anti-malware scan on the first cloud resource, or checking if there are cloud identities associated with the first cloud resource and if so removing the permissions associated with the cloud identities. A resource identification that uniquely identifies the cloud resource can be associated with each cloud resource of the cloud provider of the cloud resources. A metadata server identification that uniquely identifies the metadata server can be associated with respective metadata servers of each of a plurality of cloud providers. A first cloud provider identification that uniquely identifies the cloud provider can be associated with each cloud resource of the cloud provider. A cloud provider identification that uniquely identifies a cloud provider of the cloud providers that hosts the respective metadata server can be associated with each of the respective metadata servers.

The cloud provider identification associated with the metadata server of the cloud provider can equal the first cloud provider identification. The method can include recording, in the application programming interface (API) access log, for each request to a metadata server of the respective metadata servers and from a cloud resource of the cloud resources (i) the resource identification of the cloud resource, (ii) the first cloud provider identification, (iii) the metadata server identification associated with the metadata server, and (iv) a second cloud provider identification of the cloud provider that manages the metadata server. Comparing the cloud provider of the cloud resource and the cloud provider of the metadata server can include comparing the first and second cloud provider identifications. The request can be a hypertext transfer protocol (HTTP) request from the cloud resource to a non-routable endpoint that is the metadata server.

DETAILED DESCRIPTION

Figure 1:
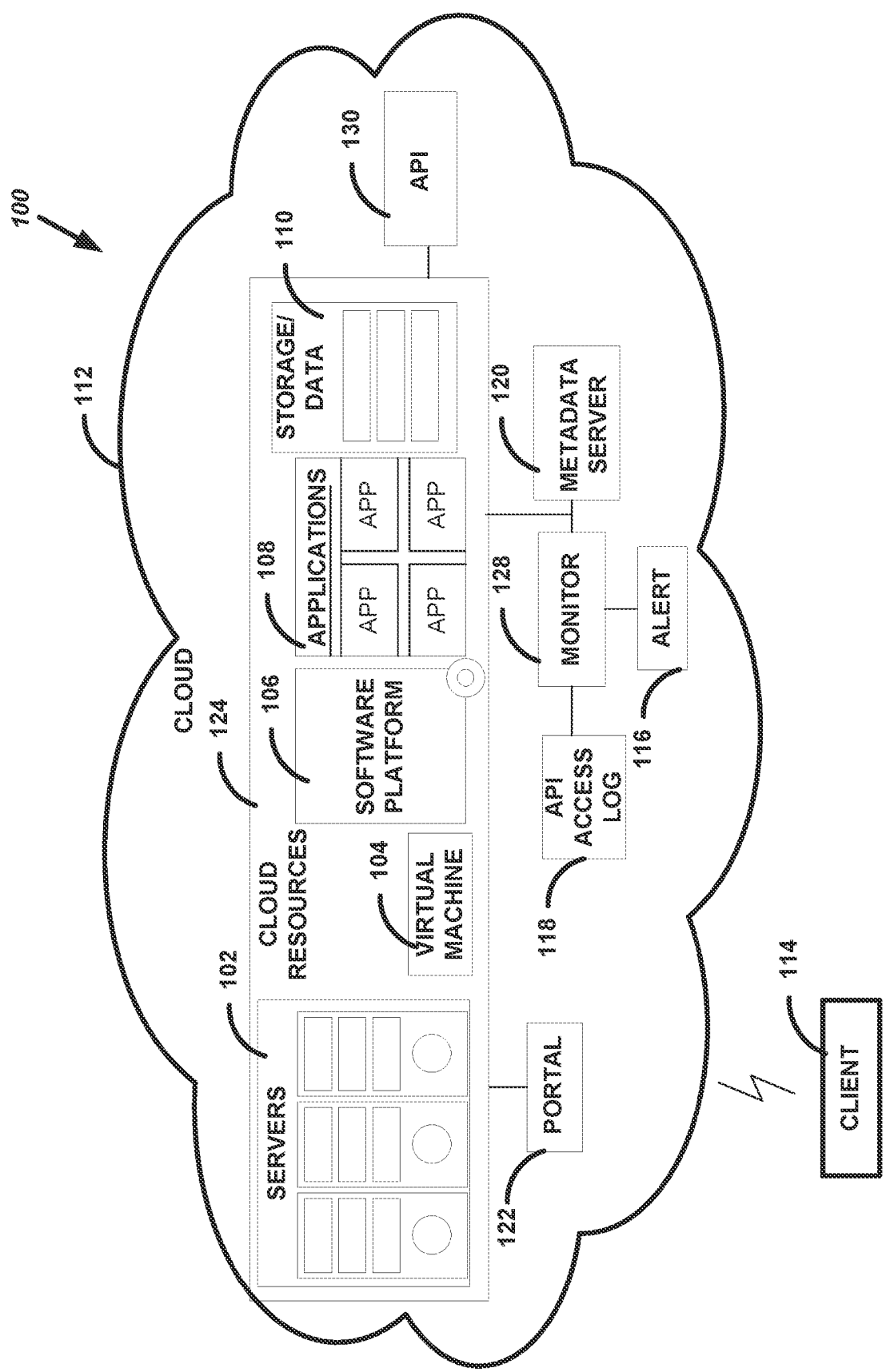
FIG. 1 illustrates, by way of example, a diagram of an embodiment of a cloud service system.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

Embodiments include monitoring which application programming interfaces (APIs) are being accessed by a cloud user while the user is using a cloud resource. API access information can help in detecting a cyber attack on a cloud service.

From a perspective of an attacker, a behavior of many cloud services is identical across different cloud providers. For example, the behavior of a virtual machine (VM) running in the cloud is similar across cloud providers. Likewise, the behavior of web hosting services of the various cloud providers is similar.

When obtaining access to cloud compute resources (e.g., VM, web hosting service, Kubernetes cluster, or the like) an adversary is likely to attempt to fetch a secret including a cloud credential (e.g., username, password, token, certificate, or the like), a key (e.g., cryptography keys), or the like. The secret can then be used for authenticating with a cloud API that controls access between cloud resources.

Some cloud providers implement a special endpoint called a metadata server. The metadata server allows applications running on cloud compute resources to retrieve access tokens to the cloud API. Access to the endpoint can be made by a direct call (e.g., by using curl\wget tools) or by using client utilities of a cloud provider (e.g., az for Azure, aws for Amazon Warehouse Services (AWS), and gcloud for Google Cloud Platform (GCP)). Cloud providers publish various programming language libraries that allow access to their endpoints.

Attackers that get access to cloud compute resources through the API can leverage easy access to the metadata server to steal a token. An improved cloud resource security method can detect attempts to steal cloud identities. The improved cloud resource security method can use metadata server request analysis. The method can detect real-world attacks that target cloud resources.

Embodiments can monitor process creation and networking data of cloud compute resources. Based on this information, embodiments can detect a suspicious call to the metadata server.

An example technique for detecting a cloud resource attack can include labeling each monitored compute resource according to its cloud provider. Such a labeling associates the compute resource with a source cloud provider. The technique can further include monitoring hypertext transfer protocol (HTTP) traffic from the compute resource to specified endpoints that are used as metadata servers. The metadata servers provide secrets that can be used for accessing, from the cloud resource, other cloud resources. The technique can further include parsing the HTTP request address and matching the address to a known identity endpoint of one of the cloud providers. Such a matching associates the metadata server with a cloud provider. The technique can further include comparing the cloud provider of the requested endpoint with the label of the resource. If the cloud provider that is the target of the request does not match the cloud provider of the cloud resource from which the request was issued, a security alert can be provided to a customer, such as the cloud provider of the cloud resource or the cloud provider of the metadata server.

For example, if a request is sent to an identity endpoint that belongs to GCP based on the HTTP request but the resource is hosted on Azure, based on the compute resource being labeled as "Microsoft" or the like, a security alert can be sent to Google or Microsoft. Embodiments can be used with other cloud computing attack solutions.

Reference will now be made to the FIGS. to describe further details of embodiments. The FIGS. illustrate examples of embodiments and one or more components of one embodiment can be used with, or in place of, a component of a different embodiment. A reference number with a letter suffix represents a specific instance of a component that is generally represented by a reference number without a letter suffix. For example, the cloud resources 124A are a specific instance of the general cloud resources 124.

FIG. 1 illustrates, by way of example, a diagram of an embodiment of a cloud service system 100. The cloud service system 100 provides cloud computing services to various computing systems such as desktops, laptops, tablets, smartphones, embedded computers, point-of-sale terminals, and so on. The cloud service system 100 includes cloud resources that can include, for example, servers and storage devices as well as various software products such as operating systems, databases, and applications.

Rather than maintaining their own data centers and software execution environments, many enterprises (e.g., "cloud customers") subscribe as customers of a database service of the cloud service system 100 to store and process their data. For example, a retail company can subscribe to a database service to store records of the sales transactions of the company and use an interface provided by the database service to run queries to help in analyzing the sales data. As another example, a utility company can subscribe to a database service for storing meter readings collected from the meters of its customers. As yet another example, a government entity can subscribe to a database service for storing and analyzing tax return data of millions of taxpayers.

Enterprises that subscribe to the cloud service system 100 want data privacy and security assurances. Although the cloud service system 100 can employ many techniques to help preserve the privacy of customer data, parties seeking to steal such customer data are continually devising new techniques to access the data.

The cloud infrastructure 112 is a network of servers and other computer resources that are accessible through the Internet and provides a variety of hardware and software services. These resources are designed to either store and manage data (e.g., storage/data 110), run applications 108, or deliver content or a service (e.g., through servers 102). Services can include streaming videos, web mail, office productivity software, or social media, among others. Instead of accessing files and data from a local or personal computer, cloud data is accessed online from an Internet-capable device, such as client 114.

The system 100 as illustrated includes the cloud infrastructure 112 and the client 114. The cloud infrastructure 112 includes computing resources 124 which the client 114 can access for their own computing needs. The computer devices as illustrated include servers 102, virtual machines 104, software platform 106, applications 108, storage/data 110, and portal 122, A user of the client 114 can access resources 124 of the cloud infrastructure 112. To access the resources 124, the user can log into the portal 122. Logging into the portal 122 can include providing a username, password, two-factor authentication, or the like. The user can then generate one or more cloud resources 124, move one or more cloud resources 124, connect one or more cloud resources 124 to each other, access one or more cloud resources 124, alter an access or security policy for one or more cloud resources 124, or the like.

As the user executes tasks using the cloud resources 124, a monitor 128 can generate entries in an application programming interface (API) access log 118. The monitor 128 can include software, hardware, firmware, or a combination thereof. The entries in the API access log 118 can include at least some of the following information: (i) a user identification (ID) that uniquely identifies the user that was logged in to the portal 122 to perform an operation on or using the cloud resources 124, (ii) a resource ID that uniquely identifies the cloud resource 124 that is a target of an operation performed by the user associated with the user ID (e.g., a uniform resource identifier (URI) or the like), (iii) an operation performed by the user associated with the user ID and on the resource associated with the resource ID, (iv) a time at which the user associated with the user ID performed the operation on the resource associated with the resource ID, (v) a first cloud provider of the identified cloud resource 124, and (vi) a second cloud provider associated with a target of a request. The entries can be organized in a table such that entries across a row or column can correspond to a same event, called an "action" herein. An example API access log is provided:

TABLE 1

Example API Access Log

| User ID | Re-sourceID | Operation | Time | Day | Resource CP | Metadata Server CP |
|---|---|---|---|---|---|---|
| Newton | VM3 | Request Secret | 17:59 | Weds | Microsoft | Microsoft |
| Maxwell | Server8 | Request Secret | 9:17 | Mon | Microsoft | Microsoft |

TABLE 1-continued

Example API Access Log

| User ID | Re-sourceID | Operation | Time | Day | Resource CP | Metadata Server CP |
|---|---|---|---|---|---|---|
| Bohr | Database4 | Request Secret | 1:17 | Sat | Microsoft | Microsoft |
| Planck | App1 | Request Secret | 4:44 | Thurs | Microsoft | Amazon |

Table 1 is simplified to aid in understanding of the subject matter described. Typically, the API access log 118 includes more than four entries. The API access log 118 includes requests to access an API from one of the cloud resources 124. With hundreds of users and many cloud providers, the API access log 118 can get quite large.

The API access log 118 is distinct from a resource management log and also distinct from a resource operation log. The resource operation log regards operations by the cloud resources while the resource management log details operations for management of the cloud resources 124 (sometimes called operations performed on the resources). The resource operation log records all operations of the cloud resource 124 (e.g., memory reads, memory writes, app to app communications, application execution, or the like). The resource management log records all operations performed in the portal 122 initiated by a user (e.g., database 110 generation, connecting cloud resources 124, deploying an app 108, deleting or generating a virtual machine 104, or the like). Operations performed in the portal 122 are operations on the cloud resource 124. The API access log 118 in contrast records a source cloud provider and a destination cloud provider for an HTTP request originating from one of the cloud resources 124. This distinction is important because typical security, like a security measure provided based on the resource operation log, provides endpoint protection. In the example of cloud systems, such as the system 100, the endpoint is the cloud resource 124. The security measures provided by endpoint protection can be different from the security measures provided based on the resource management log. The endpoint protection detects whether a particular cloud resource 124 is attacked. The security measures provided based on the resource management log or the API access log 118 can include security for types of attacks that are not detectable based on the resource operation log. For example, the security measures provided based on the resource management log or the API access log 118 can include phishing-based or other exfiltration of data, or other attack that is staged across multiple cloud resources. The API access log 118, however, can be used to detect an attack as it is occurring, while the resource operation log is not as useful for such a detection.

Consider a scenario in which an attacker has received login information for a user, such as through phishing. That attacker can then login to the portal 122 and deploy a mechanism to perform reconnaissance and gather information about the structure of the cloud resources 124 deployed. The attacker can then target a specific resource the attacker desires. The attacker can gain access to a cloud resource of the cloud resources 124 and then request the metadata server 120 for a token or other secret that provides resource-to-resource access. The metadata server 120 can respond with the secret since it does not know that the resource 124 is being used by the attacker. The secret can be identifying information for the cloud resource 124 that is requesting access to the other cloud resource.

The servers 102 can provide results as a result of a request for computation. The server 102 can be a file server that provides a file in response to a request for a file, a web server that provides a web page in response to a request for website access, an electronic mail server (email server) that provides contents of an email in response to a request, a login server that provides an indication of whether a username, password, or other authentication data are proper in response to a verification request.

The virtual machine (VM) 104 is an emulation of a computer system. The VM 104 provides the functionality of a physical computer. VMs can include system VMs that provide the functionality to execute an entire operating system (OS) or process VMs that execute a computer application in an isolated, platform independent environment. VMs can be more secure than a physical computer as an attack on the VM is merely an attack on an emulation. VMs can provide functionality of first platform (e.g., Linux, Windows, or another OS) on a second, different platform.

The software platform 106 is an environment in which a piece of software is executed. The software platform 106 can include hardware, OS, a web browser and associated application programming interfaces (APIs), or the like. The software platform 106 can provide tools for developing more computer resources, such as software. The software platform 106 can provide low-level functionality for a software developer.

The applications 108 can be accessible through one of the servers 102, the VM 104, a container, or the like. The applications 108 provide compute resources to a user such that the user does not have to download or execute the application on their own computer. The applications 108, for example, can include a machine learning (ML) suite that provides configured or configurable ML software. The ML software can include artificial intelligence type software, such as a neural network (NN) or other technique. The ML or artificial intelligence (AI) techniques can have memory or processor bandwidth requirements that are prohibitively expensive or complicated for some cloud customers to implement or support.

The storage/data 110 can include one or more databases, containers, or the like for memory access. The storage/data 110 can be partitioned such that a given user has dedicated memory space. A service level agreement (SLA) generally defines an amount of uptime, downtime, maximum or minimum lag in accessing the data, or the like.

The client 114 is a compute device capable of accessing the functionality of the cloud infrastructure 112. The client 114 can include a smart phone, tablet, laptop, desktop, a server, television or other smart appliance, a vehicle (e.g., a manned or unmanned vehicle), or the like. The client 114 accesses the resources provided by the cloud infrastructure 112. Each request from the client 114 can be associated with an internet protocol (IP) address identifying the client 114, a username identifying a user of the device, a customer identification indicating an entity that has permission to access the cloud infrastructure 112, or the like.

An alert 116 can be provided to the client 114 responsive to an API access log anomaly detection. The anomaly in the API access log 118 can be determined by the monitor 128. The alert 116 can include a pop-up window, text message, email, or the like. The alert 116 can include information that led to production of the alert 116 or a link that, when selected, navigates a user to the information that led to production of the alert 116. The client 114 can be associated with personnel of the cloud infrastructure 112. The personnel can include engineers, technicians, communications specialists, security experts, or another entity responsible for secure and reliable operation of the cloud infrastructure 112.

The metadata server 120 provides information about the cloud resources 124. The metadata server 120 can be used to access and configure the cloud resources 124. The metadata server 120 is accessed via an API, such as a representational state transfer (REST) API. The metadata server 120 is available through a known, non-routable internet protocol (IP) address. Non-routable means that the metadata server 120 is only accessible through the cloud resources 124 and communicating through the metadata server 120 hosted by the same cloud provider will not leave the host network infrastructure. A request from within the cloud resources 124 to the metadata server 120 thus should be to a static IP address. A request to a metadata server of a different cloud provider than the one that is hosting the cloud resources 124 indicates an anomaly.

The monitor 128 can include software, firmware, or hardware configured to perform operations of API access log 118 analysis. The monitor 128 can receive or access the API access log 118. The monitor 128 can determine whether an anomaly is present in the API access log 118. An anomaly can indicate an attack, such as cannot be detected based on other logs. An anomaly in this context is an action, or related entries, that is determined be an unexpected cloud resource management operation. Such an anomaly is indicated by the cloud providers of related entries in the API access log 118 being different. In Table 1, the final row of the Table includes related entries with different cloud providers.

The monitor 128 can find the one or more unexpected actions of the user in the cloud resources 124 by analyzing the API access log 118 (e.g., and only the resource management log 118). The monitor 128 is described in more detail in FIG. 2.

The cloud infrastructure 112 is accessible by any client 114 with sufficient permission. Usually a customer will pay for or otherwise gain permission to access the cloud infrastructure 112 using one or more devices. Since multiple services and multiple clients 114 with different habits can access the cloud infrastructure 112, it is difficult to provide a "one size fits all" security solution. Typically, an attack on the server 102 is different than an attack on the VM 104, which is different than an attack on a container, etc. These different attack vectors are usually handled by instantiating different security techniques with monitoring at each device, such as by the monitor 128. Also, these attack vectors can be related, as an attack on a container can be triggered by an impersonation attack, which can be detected by an anomaly in the API access log 118.

Note the metadata server is a specific instance of an API, and the cloud system 112 can include other APIs 130. The APIs 130 allow devices to communicate using different protocols. The APIs 130, for example, can allow a VM to communicate with a database, an APP, or other cloud resource. The API 130 converts the information from a protocol used by a first, requesting cloud resource to a second, destination cloud resource and vice versa.

Figure 2:
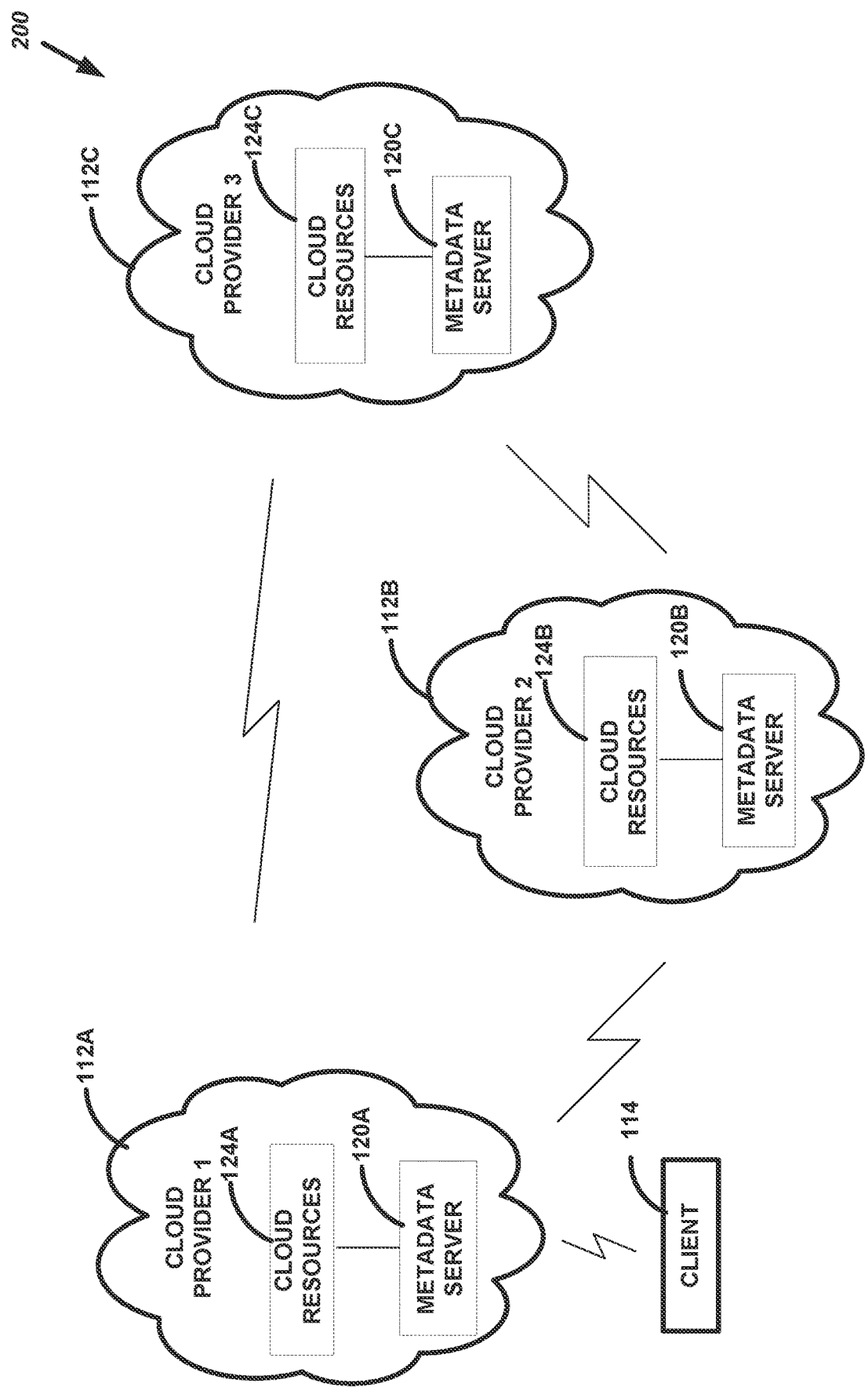
FIG. 2 illustrates, by way of example, a block diagram of a cloud system.

FIG. 2 illustrates, by way of example, a block diagram of a cloud system 200. The cloud system 200 as illustrated includes three cloud providers providing respective cloud systems 112A, 112B, 112C. Each of the cloud systems 112A, 112B, 112C includes respective cloud resources 123A, 124B, 124C and a respective metadata server 120A, 120B, 120C.

An attacker can gain access to the cloud resources 124A, 124B, 124C, such as through an attack on the client 114. The attacker, in performing the attack, may not understand which cloud provider is hosting the cloud system 112A, 112B, 112C. This discussion assumes the attacker has gained access to the cloud system 112A through the client 114. The attacker might know an IP address for a metadata server 120B, 120C of a different cloud provider than the one hosting the cloud system 112A. The attacker can cause a cloud resource of the cloud resources 124A to issue an HTTP request to a metadata server 120B, 120C of the cloud systems 112B, 112C. This request to the metadata server 120B, 120C of a different cloud provider does not happen in normal cloud resource operation and is a strong indicator of nefarious action.

It is not possible to identify such an attack using the resource operation log or the resource management log. However, such an attack can be identified using the API access log 118 because the API access log 118 records the cloud provider of the cloud resources 124A, 124B, 124C and the cloud provider of metadata servers 120A, 120B, 120C, which is not recorded in other logs.

Figure 3:
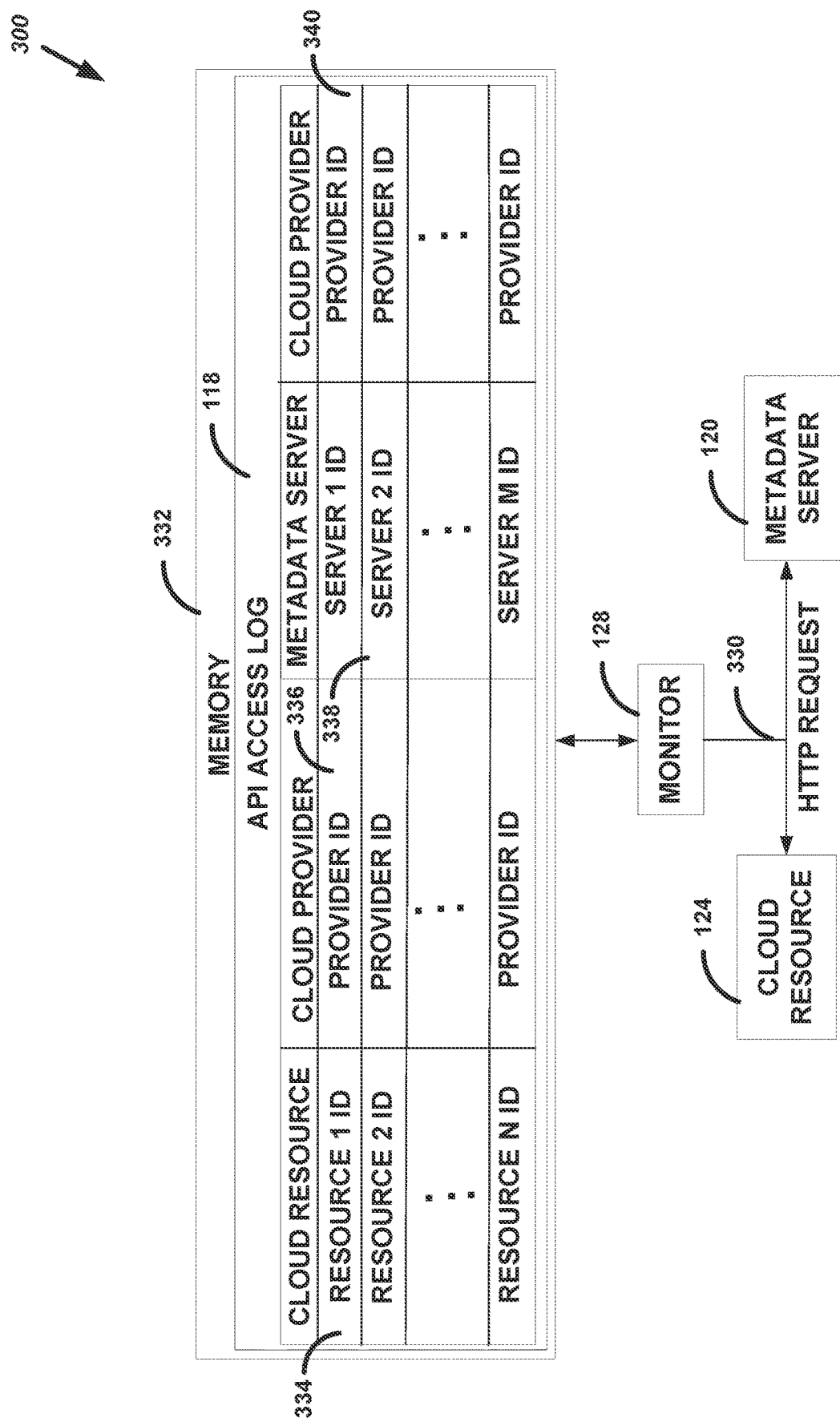
FIG. 3 illustrates, by way of example, a block diagram of an embodiment of a system for detecting an attack on a cloud resource.

FIG. 3 illustrates, by way of example, a block diagram of an embodiment of a system 300 for detecting an attack on a cloud resource 124. The system 300 as illustrated includes a monitor 128 that scans and records traffic within a cloud network. The monitor 128 analyzes HTTP traffic 330 from the cloud resources 124 and stores some details of some of the HTTP traffic 330 in the API access log 118.

The HTTP traffic 330 of interest is HTTP requests to the metadata server 120. An HTTP request includes a method or noun (e.g., PUT, GET, POST, HEAD, OPTIONS, or the like. The HTTP request includes a target (sometimes called a destination) that is the object of the request. The target can be specified as a URI, absolute path of the protocol, port, and domain, or the like.

The monitor 128 looks for HTTP requests in the traffic 330 that target a metadata server 120, such as any of the metadata servers 120A, 120B, 120C. If the target of the HTTP request corresponds to one of the metadata servers 120A, 120B, 120C, the monitor 128 can record the cloud resource 124 and cloud provider of the cloud resource 124 that issued the HTTP request. The monitor 128 can also record the metadata server 120 that is the target of the HTTP request and the cloud provider of the metadata server 120 in the API access log 118. In the API access log 118, the cloud resource 124 can be represented by a resource ID 334, the cloud provider can be represented by a cloud provider ID 336, and the metadata server 120A, 120B, 120C can be represented by a server ID 338. Each of the IDs 334, 336, and 338 can be unique to the particular resource or provider. That is, each cloud resource 124 is associated with an ID 334 that is not associated with any other cloud resource 124 for that cloud provider associated with the provider ID 336, each cloud provider is associated with an ID 336, 340 that is unique to the provider, and each metadata server 120 is associated with an ID 338 that is unique to the provider associated with the provider ID 340.

To detect a difference between a cloud provider of a cloud resource 124 and a cloud provider of a metadata server 120, the API access log 118 can be generated and analyzed, such as by the monitor 128. A same device that generated the API access log 118 can analyze the API access log 118 or a different device than the one that generated the API access log 118 can analyze the API access log 118.

An anomaly exists when the provider ID 336 associated with the cloud resource identified by the cloud resource ID 334 does not match the provider ID 340 associated with the metadata server identified by the metadata server ID 338 in the same row. This means that a request from a resource 124 hosted by a first cloud provider was destined for a metadata server of a different cloud provider.

A rule-based heuristic, machine learning (ML) model, or the like can be implemented by the monitor 128 to detect an anomaly in the API access log 118. While an anomaly is described previously, embodiments can detect other anomalies as well. A heuristic can include, for example, if cloud provider of metadata server does not equal cloud provider of cloud resource requesting access to metadata server, issue an alert, else return.

Using ML, such as a neural network (NN), a decision tree, logistic regression, k-nearest neighbor, support vector machines, reinforcement learning, or the like, anomalies, such as the anomalies discussed above or other anomalies, can be detected. For the anomaly discussed above a rule-based heuristic can be sufficient, but for detection of unknown anomalies or more complex patterns, an ML model or a more complex heuristic can be used. To detect some anomalies, the API access log 118 can be analyzed along with a corresponding resource management log, resource operation log, other log, or a combination thereof.

An example ML model can be trained in a supervised, semi-supervised, or unsupervised manner. Supervise training can use example API access log entries and example expected classifications to be made by the ML model. Parameters of the ML model can be optimized to reduce or minimize a cost defined by an objective function. The parameter optimization can use stochastic gradient descent that operates based on a difference between an expected classification and an actual classification made by the ML model.

Figure 4:
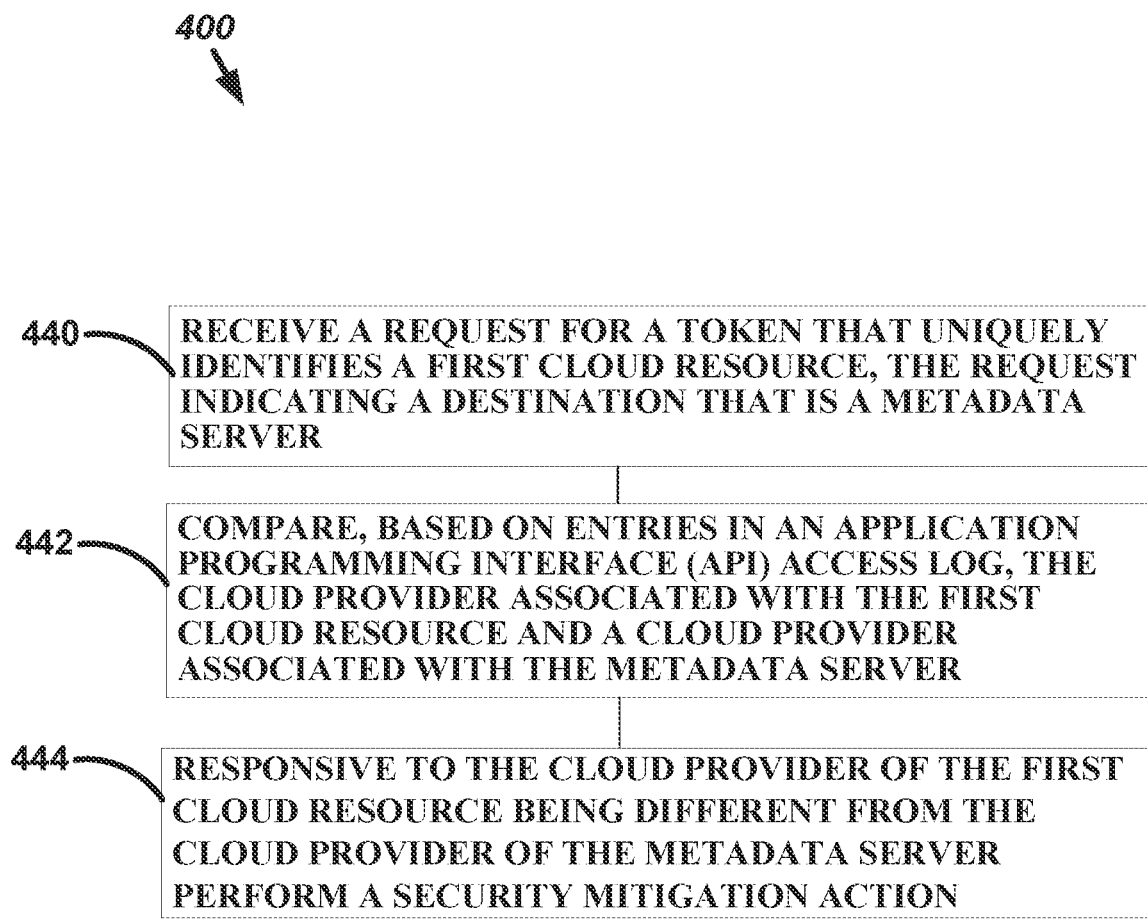
FIG. 4 illustrates, by way of example, a diagram of an embodiment of a method for cloud resource security.

FIG. 4 illustrates, by way of example, a diagram of an embodiment of a method 400 for cloud resource security. The method 400 as illustrated includes receiving, at a monitor device and from a first cloud resource of cloud resources hosted by a cloud provider, a request for a token that uniquely identifies the first cloud resource, the request indicating a destination that is a metadata server, at operation 440; comparing, based on entries in an application programming interface (API) access log, the cloud provider associated with the first cloud resource and a cloud provider associated with the metadata server, at operation 442; and responsive to the cloud provider of the first cloud resource being different from the cloud provider of the metadata server performing a security mitigation action, at operation 444.

The security mitigation action of operation 444 can include one of checking the legitimacy of the request, running an anti-malware scan on the first cloud resource, or checking if there are cloud identities associated with the first cloud resource and if so removing the permissions associated with the cloud identities. The method 400 can further include associating with each cloud resource of the cloud provider of the cloud resources, a resource identification that uniquely identifies the cloud resource. The method 400 can further include associating with respective metadata servers of each of a plurality of cloud providers, a metadata server identification that uniquely identifies the metadata server. The method 400 can further include associating with each cloud resource of the cloud provider, a first cloud provider identification that uniquely identifies the cloud provider. The method 400 can further include associating with each of the respective_metadata servers, a cloud provider identification that uniquely identifies a cloud provider of the cloud providers that hosts the respective metadata server.

The method 400 can further include, wherein the cloud provider identification associated with the metadata server of the cloud provider equals the first cloud provider identification. The method 400 can further include recording, in the application programming interface (API) access log, for each request to a metadata server of the respective metadata servers and from a cloud resource of the cloud resources (i) the resource identification of the cloud resource, (ii) the first cloud provider identification, (iii) the metadata server identification associated with the metadata server, and (iv) a second cloud provider identification of the cloud provider that manages the metadata server. The method 400 can further include, wherein comparing the cloud provider of the cloud resource and the cloud provider of the metadata server includes comparing the first and second cloud provider identifications. The method 400 can further include, wherein the request is a hypertext transfer protocol (HTTP) request from the cloud resource to a non-routable endpoint that is the metadata server.

Figure 5:
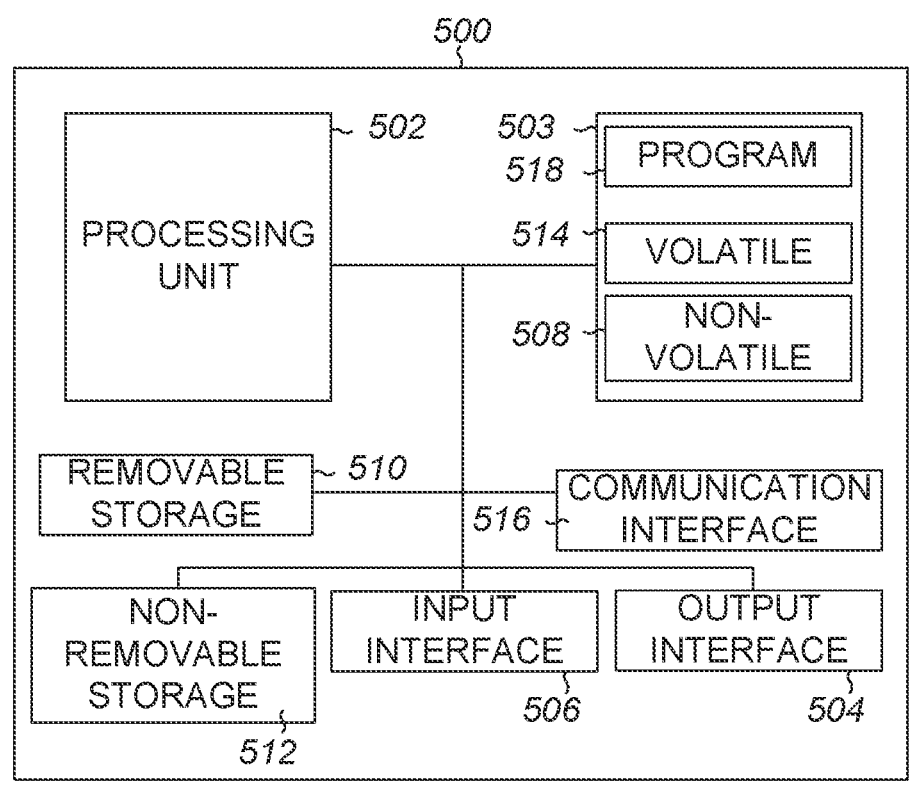
FIG. 5 illustrates, by way of example, a block diagram of an embodiment of a machine (e.g., a computer system) to implement one or more embodiments.

FIG. 5 illustrates, by way of example, a block diagram of an embodiment of a machine 500 (e.g., a computer system) to implement one or more embodiments. One or more of the cloud resources 124, portal 122, monitor 128, metadata server 120, API access log 118, alert 116, client 114, memory 332, method 400, or a component or operations thereof can be implemented, at least in part, using a component of the machine 500. One example machine 500 (in the form of a computer), may include a processing unit 502, memory 503, removable storage 510, and non-removable storage 512. Although the example computing device is illustrated and described as machine 500, the computing device may be in different forms in different embodiments. For example, the computing device may instead be a smartphone, a tablet, smartwatch, or other computing device including the same or similar elements as illustrated and described regarding FIG. 5. Devices such as smartphones, tablets, and smartwatches are generally collectively referred to as mobile devices. Further, although the various data storage elements are illustrated as part of the machine 500, the storage may also or alternatively include cloud-based storage accessible via a network, such as the Internet.

Memory 503 may include volatile memory 514 and non-volatile memory 508. The machine 500 may include— or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 500 may include or have access to a computing environment that includes input 506, output 504, and a communication connection 516. Output 504 may include a display device, such as a touchscreen, that also may serve as an input component. The input 506 may include one or more of a touchscreen, touchpad, mouse, keyboard, camera, one or more device-specific buttons, one or more sensors integrated within or coupled via wired or wireless data connections to the machine 500, and other input components. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 502 (sometimes called processing circuitry) of the machine 500. A hard drive, CD-ROM, and RAM are some examples of articles including a non-transitory computer-readable medium such as a storage device. For example, a computer program 518 may be used to cause processing unit 502 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like). The terms computer-readable medium, machine readable medium, and storage device do not include carrier waves or signals to the extent carrier waves and signals are deemed too transitory.

Additional Notes and Examples

Example 1 includes a method for cloud resource security, the method comprising receiving, at a monitor device and from a first cloud resource of cloud resources hosted by a cloud provider, a request for a token that uniquely identifies the first cloud resource, the request indicating a destination that is a metadata server, comparing, based on entries in an application programming interface (API) access log, the cloud provider associated with the first cloud resource and a cloud provider associated with the metadata server, and responsive to the cloud provider of the first cloud resource being different from the cloud provider of the metadata server performing a security mitigation action.

In Example 2, Example 1 further includes, wherein the security mitigation action includes one of checking the legitimacy of the request, running an anti-malware scan on the first cloud resource, or checking if there are cloud identities associated with the first cloud resource and if so removing the permissions associated with the cloud identities.

In Example 3, at least one of Examples 1-2 further includes associating with each cloud resource of the cloud provider of the cloud resources, a resource identification that uniquely identifies the cloud resource, and associating with respective metadata servers of each of a plurality of cloud providers, a metadata server identification that uniquely identifies the metadata server.

In Example 4, Example 3 further includes associating with each cloud resource of the cloud provider, a first cloud provider identification that uniquely identifies the cloud provider, and associating with each of the respective metadata servers, a cloud provider identification that uniquely identifies a cloud provider of the cloud providers that hosts the respective metadata server.

In Example 5, Example 4 further includes, wherein the cloud provider identification associated with the metadata server of the cloud provider equals the first cloud provider identification.

In Example 6, Example 5 further includes recording, in the application programming interface (API) access log, for each request to a metadata server of the respective metadata servers and from a cloud resource of the cloud resources (i) the resource identification of the cloud resource, (ii) the first cloud provider identification, (iii) the metadata server identification associated with the metadata server, and (iv) a second cloud provider identification of the cloud provider that manages the metadata server.

In Example 7, Example 6 further includes, wherein comparing the cloud provider of the cloud resource and the cloud provider of the metadata server includes comparing the first and second cloud provider identifications.

In Example 8, at least one of Examples 1-7 further includes, wherein the request is a hypertext transfer protocol (HTTP) request from the cloud resource to a non-routable endpoint that is the metadata server.

Example 9 includes a monitor device comprising processing circuitry, and a memory including instructions that, when executed by the processing circuitry, cause the processing circuitry to perform operations for cloud resource security, the operations comprising receiving, from a first cloud resource of cloud resources hosted by a cloud provider, a request for a token that uniquely identifies the first cloud resource, the request indicating a destination that is a metadata server, comparing, based on respective entries in an application programming interface (API) access log, the respective entries including a respective resource identifier of a cloud resource of the cloud resources, a first cloud provider identifier of the cloud provider associated with the cloud resource, a second cloud provider identifier associated with the metadata server, and a metadata server identifier of the metadata serve, the cloud provider associated with the first cloud resource and the second cloud provider, and responsive to the cloud provider of the first cloud resource being different from the second cloud provider of the metadata server causing a security mitigation action to be performed.

In Example 10, Example 9 further includes, wherein the operations further comprise recording, in the application programming interface (API) access log, for each request to a metadata server of the respective metadata servers and from a cloud resource of the cloud resources (i) the resource identification of the cloud resource, (ii) the first cloud provider identification, (iii) the metadata server identification associated with the metadata server, and (iv) a second cloud provider identification of the cloud provider that manages the metadata server.

In Example 11, Example 10 further includes, wherein comparing the cloud provider of the cloud resource and the cloud provider of the metadata server includes comparing the first and second cloud provider identifications.

In Example 12, at least one of Examples 9-11 further includes, wherein the request is a hypertext transfer protocol (HTTP) request from the cloud resource to a non-routable endpoint that is the metadata server.

Example 13 includes a machine-readable medium including instructions that, when executed by a machine, cause the machine to perform operations for cloud resource security, the operations comprising receiving, at a monitor device and from a first cloud resource of cloud resources hosted by a cloud provider, a request for a token that uniquely identifies the first cloud resource, the request indicating a destination that is a metadata server, comparing, based on entries in an application programming interface (API) access log, the cloud provider associated with the first cloud resource and a cloud provider associated with the metadata server, and responsive to the cloud provider of the first cloud resource being different from the cloud provider of the metadata server performing a security mitigation action.

In Example 14, Example 13 further includes, wherein the security mitigation action includes one of checking the legitimacy of the request, running an anti-malware scan on the first cloud resource, or checking if there are cloud identities associated with the first cloud resource and if so removing the permissions associated with the cloud identities.

In Example 15, at least one of Examples 13-14 further includes, wherein the operations further comprise associating with each cloud resource of the cloud provider of the cloud resources, a resource identification that uniquely identifies the cloud resource, and associating with respective metadata servers of each of a plurality of cloud providers, a metadata server identification that uniquely identifies the metadata server.

In Example 16, Example 15 further includes, wherein the operations further comprise associating with each cloud resource of the cloud provider, a first cloud provider identification that uniquely identifies the cloud provider, and associating with each of the respective_metadata servers, a cloud provider identification that uniquely identifies a cloud provider of the cloud providers that hosts the respective metadata server.

In Example 17, Example 16 further includes, wherein the cloud provider identification associated with the metadata server of the cloud provider equals the first cloud provider identification.

In Example 18, Example 17 further includes, wherein the operations further comprise recording, in the application programming interface (API) access log, for each request to a metadata server of the respective metadata servers and from a cloud resource of the cloud resources (i) the resource identification of the cloud resource, (ii) the first cloud provider identification, (iii) the metadata server identification associated with the metadata server, and (iv) a second cloud provider identification of the cloud provider that manages the metadata server.

In Example 19, Example 18 further includes, wherein comparing the cloud provider of the cloud resource and the cloud provider of the metadata server includes comparing the first and second cloud provider identifications.

In Example 20, at least one of Examples 13-19 further includes, wherein the request is a hypertext transfer protocol (HTTP) request from the cloud resource to a non-routable endpoint that is the metadata server.

Although a few embodiments have been described in detail above, other modifications are possible. For example, the logic flows depicted in the figures do not require the order shown, or sequential order, to achieve desirable results. The desirable for embodiments can include the user having confidence in the state of their data, settings, controls, and secrets before, during, and after a migration to a new version of an application. Using multiple factors to check data state, integrity, presence, and absence before and after the migration can increase confidence. Other steps may be provided, or steps may be eliminated, from the described flows, and other components may be added to, or removed from, the described systems. Other embodiments may be within the scope of the following claims.

What is claimed is:

1. A method for cloud resource security, the method comprising:
 recording, in an application programming interface (API) access log, for a request to a metadata server of respective metadata servers and from a first cloud resource of cloud resources (i) a resource identification of the first cloud resource, (ii) a first cloud provider identification of a first cloud provider that manages the first cloud resource, (iii) the metadata server identification associated with the metadata server, and (iv) a second cloud provider identification of a second cloud provider that manages the metadata server;
 receiving, at a monitor device and from the first cloud resource of cloud resources hosted by the first cloud provider, a request for a token that uniquely identifies the first cloud resource, the request indicating a destination that is the metadata server, the metadata server provides secrets for accessing, from the first cloud resource, other cloud resources of the cloud resources;
 comparing, based on entries in the API access log that details information of requests to access an API from the cloud resources, the first cloud provider and the second cloud provider; and
 responsive to the first cloud provider being different from the second cloud provider performing a security mitigation action.

2. The method of claim 1, wherein the security mitigation action includes one of checking a legitimacy of the request, running an anti-malware scan on the first cloud resource, or checking if there are cloud identities associated with the first cloud resource and if so removing permissions associated with the cloud identities.

3. The method of claim 1, further comprising:
 associating with each cloud resource of the cloud provider of the cloud resources, a resource identification that uniquely identifies the cloud resource; and
 associating with respective metadata servers of each of a plurality of cloud providers, a metadata server identification that uniquely identifies the metadata server.

4. The method of claim 3, further comprising:
 associating with each cloud resource of the cloud provider, a first cloud provider identification that uniquely identifies the cloud provider; and
 associating with each of the respective metadata servers, a cloud provider identification that uniquely identifies a cloud provider of the cloud providers that hosts the respective metadata server.

5. The method of claim 4, wherein the cloud provider identification associated with the metadata server of the cloud provider equals the first cloud provider identification.

6. The method of claim 5, wherein comparing the cloud provider of the cloud resource and the cloud provider of the metadata server includes comparing the first and second cloud provider identifications.

7. The method of claim 1, wherein the request is a hypertext transfer protocol (HTTP) request from the cloud resource to a non-routable endpoint that is the metadata server.

8. A monitor device comprising
processing circuitry; and
a memory including instructions that, when executed by the processing circuitry, cause the processing circuitry to perform operations for cloud resource security, the operations comprising:
  recording, in an application programming interface (API) access log, for a request to a metadata server of respective metadata servers and from a first cloud resource of cloud resources (i) a resource identification of the first cloud resource, (ii) a first cloud provider identification of a first cloud provider that manages the first cloud resource, (iii) the metadata server identification associated with the metadata server, and (iv) a second cloud provider identification of a second cloud provider that manages the metadata server;
  receiving, from the first cloud resource, a request for a token that uniquely identifies the first cloud resource, the request indicating a destination that is the metadata server, the metadata server provides secrets for accessing, from the first cloud resource, other cloud resources of the cloud resources;
  comparing, based on respective entries in the API access log that details information of requests to access an API from the cloud resources including the first and second cloud providers, the respective entries including a respective resource identifier of the first cloud resource, a first cloud provider identifier of the first cloud provider, a second cloud provider identifier associated with the metadata server, and a metadata server identifier of the metadata server; and
  responsive to the first cloud provider identifier being different from the second cloud provider identifier causing a security mitigation action to be performed.

9. The monitor device of claim 8, wherein comparing the cloud provider of the cloud resource and the cloud provider of the metadata server includes comparing the first and second cloud provider identifications.

10. The monitor device of claim 8, wherein the request is a hypertext transfer protocol (HTTP) request from the cloud resource to a non-routable endpoint that is the metadata server.

11. A non-transitory machine-readable medium including instructions that, when executed by a machine, cause the machine to perform operations for cloud resource security, the operations comprising:
  recording, in an application programming interface (API) access log, for a request to a metadata server of respective metadata servers and from a first cloud resource of cloud resources (i) a resource identification of the first cloud resource, (ii) a first cloud provider identification of a first cloud provider that manages the first cloud resource, (iii) the metadata server identification associated with the metadata server, and (iv) a second cloud provider identification of a second cloud provider that manages the metadata server;
  receiving, at a monitor device and from the first cloud resource, a request for a token that uniquely identifies the first cloud resource, the request indicating a destination that is the metadata server, the metadata server provides secrets for accessing, from the first cloud resource, other cloud resources of the cloud resources;
  comparing, based on entries in the API access log that details information of requests to access an API from the cloud resources, the first cloud provider and the second cloud provider; and
  responsive to the first cloud provider being different from the second cloud provider performing a security mitigation action.

12. The non-transitory machine-readable medium of claim 11, wherein the security mitigation action includes one of checking a legitimacy of the request, running an anti-malware scan on the first cloud resource, or checking if there are cloud identities associated with the first cloud resource and if so removing permissions associated with the cloud identities.

13. The non-transitory machine-readable medium of claim 11, wherein the operations further comprise:
  associating with each cloud resource of the cloud provider of the cloud resources, a resource identification that uniquely identifies the cloud resource; and
  associating with respective metadata servers of each of a plurality of cloud providers, a metadata server identification that uniquely identifies the metadata server.

14. The non-transitory machine-readable medium of claim 13, wherein the operations further comprise:
  associating with each cloud resource of the cloud provider, a first cloud provider identification that uniquely identifies the cloud provider; and
  associating with each of the respective metadata servers, a cloud provider identification that uniquely identifies a cloud provider of the cloud providers that hosts the respective metadata server.

15. The non-transitory machine-readable medium of claim 14, wherein the cloud provider identification associated with the metadata server of the cloud provider equals the first cloud provider identification.

16. The machine-readable medium of claim 15, wherein comparing the cloud provider of the cloud resource and the cloud provider of the metadata server includes comparing the first and second cloud provider identifications.

17. The non-transitory machine-readable medium of claim 11, wherein the request is a hypertext transfer protocol (HTTP) request from the cloud resource to a non-routable endpoint that is the metadata server.

* * * * *